UNITED STATES PATENT OFFICE.

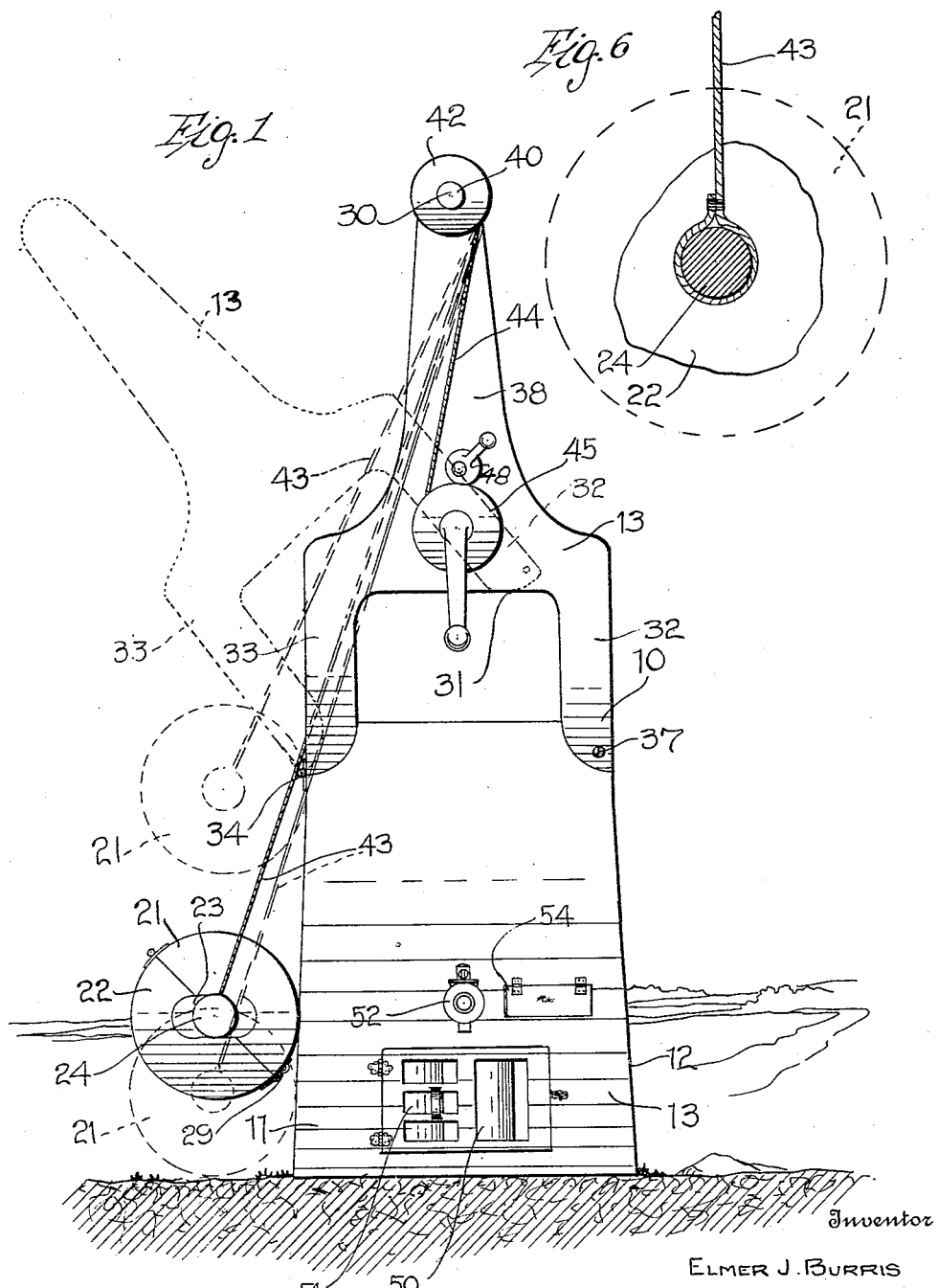

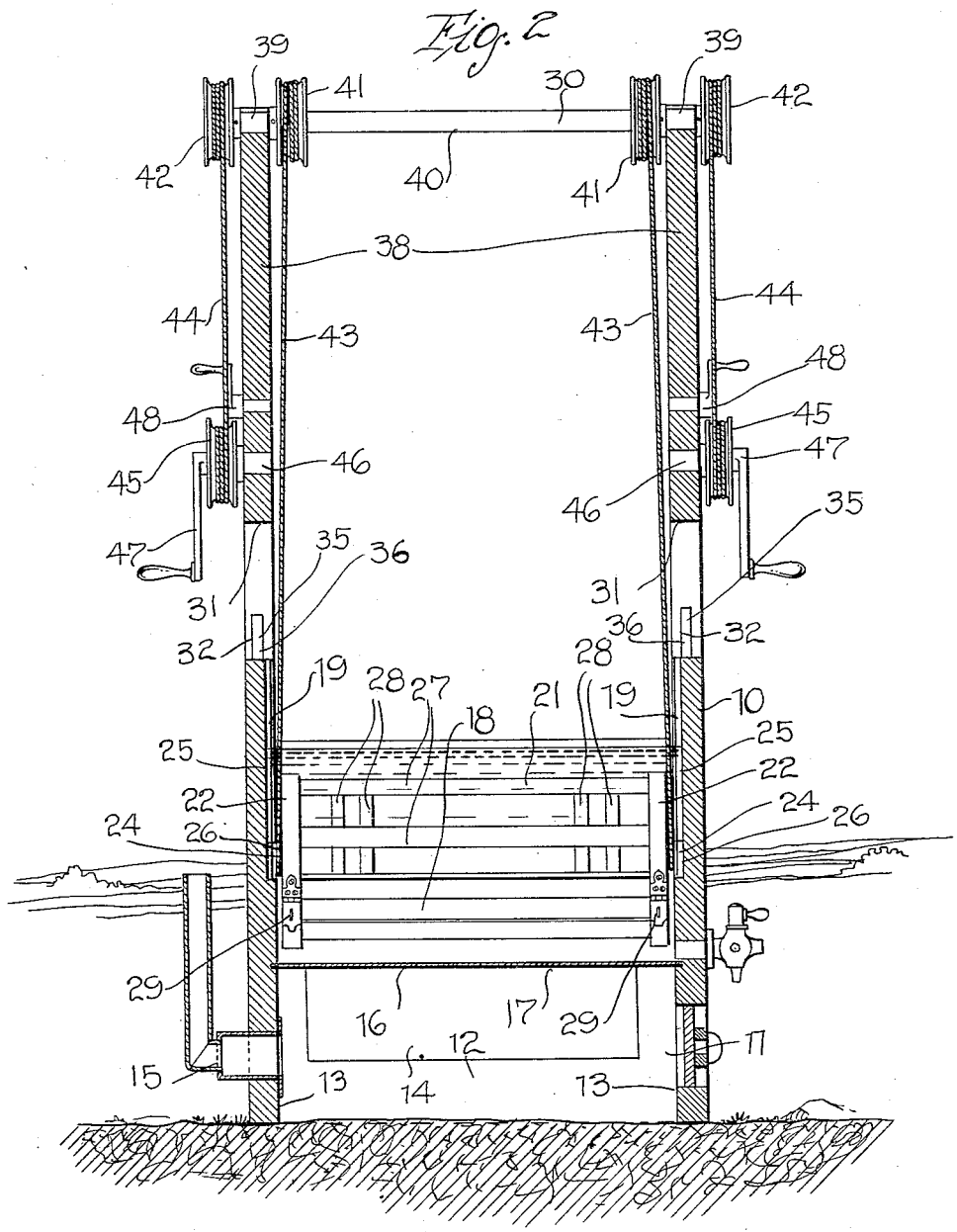

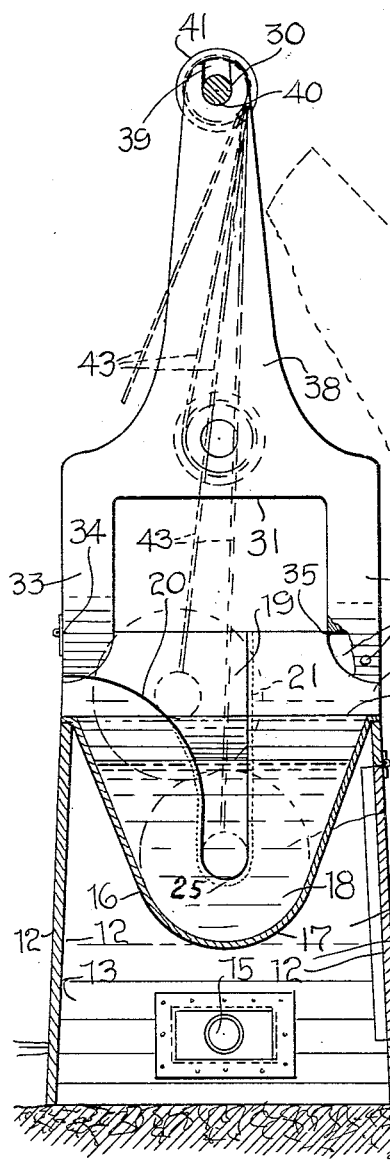
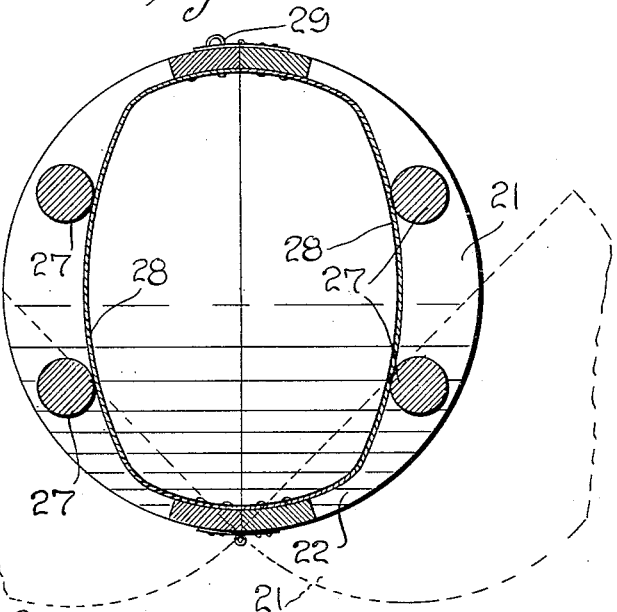
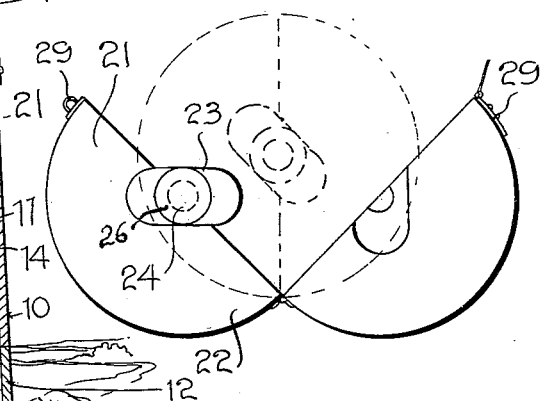

ELMER J. BURRIS, OF LITTLE FALLS, MINNESOTA.

HOG-SCALDER.

1,094,525.  Specification of Letters Patent.  Patented Apr. 28, 1914.

Application filed March 10, 1913. Serial No. 753,383.

*To all whom it may concern:*

Be it known that I, ELMER J. BURRIS, a citizen of the United States, residing at Little Falls, in the county of Morrison and State of Minnesota, have invented certain new and useful Improvements in Hog-Scalders, of which the following is a specification, reference being had to the accompanying drawings.

This invention relates to new and useful improvements in a combination hog scalder and feed cooker.

An object of this invention is the provision of a combined cooking apparatus which can be readily transferred from a device for cooking animal food or the like to a device for scalding hogs prior to the removal of the bristles therefrom.

Another object of this invention is the provision of an apparatus of this nature which employs the use of a removable windlass for raising and lowering the hog container to and from the scalder.

A further object of this invention is the provision of a device of this character which involves the use of a sectional containing cage so designed as to contain a hog or other suitable object therein in such manner that the same can be readily raised or lowered to and from the scalder without endangering the operator.

A still further object of this invention is to improve and simplify devices of this character, rendering them comparatively simple and inexpensive to manufacture, reliable and efficient in use, and readily operated.

With the above and other objects in view, this invention resides in the novel features of construction, formations, combinations, and arrangements of parts to be hereinafter more fully described, claimed and illustrated in the accompanying drawings, in which—

Figure 1 is an end view of my invention. Fig. 2 is a longitudinal sectional view thereof. Fig. 3 is a transverse sectional view thereof. Fig. 4 is a similar view taken through the cage. Fig. 5 is an end view of the cage. Fig. 6 is a view illustrating the manner in which the cage is mounted.

Referring to the accompanying drawings by similar characters of reference throughout the several views, the numeral 10 designates generally my improved apparatus, which consists of a fire box 11, consisting of opposite side and end walls 12 and 13, one of the former of which is provided with a door 14, while one of the latter is equipped with a suitable flue 15.

A plate 16 is secured at its opposite side edges to the upper edges of the side walls 12 and is bowed downwardly intermediate its longitudinal edges, as at 17, to produce with the inner faces of the end walls 13 a receptacle 18. The inner faces of the end walls 13 are vertically grooved intermediate their side edges, as at 19, which grooves are curved at their upper ends toward one side of the apparatus, as at 20, to provide a means for removably supporting the vertically adjustable containing cage 21. This cage 21 consists of a pair of circular end plates 22 formed with interlocking tongues 23 by means of which they are held against any undesired movement.

Trunnions 24 are formed upon certain sections of the end plates 22 for engagement with the beforementioned grooves 19, which are widened at their bottoms, as at 25, to receive the flanges 26 on the trunnions 24, by means of which the cage is guided to and from the receptacle 18. The segmental end plates 22 are connected adjacent their peripheries by rods 27, to which are secured, adjacent the terminals thereof, straps 28 adapted for the purpose of holding the legs of the hog to be contained within the cage against projecting between the rods 27, which would serve to interfere with the successful operation of the device. The sections of the end plates 22 are provided with suitable latches 29, by means of which the cage will be held in its closed position as desired.

A windlass 30 is removably connected to the upper ends of the end walls 13 of the apparatus, the same being forked at its lower end, as at 31, to produce parallel supporting legs 32 and 33. The rear legs 33 are connected to the end walls 13 by removable hinges 34, while the opposite legs are bifurcated, as at 35, to receive locking tongues 36 formed upon the forward upper edges of the end walls 13. Pins 37 are passed through the bifurcated terminals 35 of the legs 32 and through the tongues 36, serving to normally hold the windlass against displacement. The opposite side standards 38 of the windlass 30 are provided at their upper ends with registering bearings 39 in which is journaled an operating shaft 40, having keyed thereon between the standards 38, grooved pulleys 41, and upon the outer sides of the standards 38, similar pulleys 42. The shaft 40 also serves as a means whereby the windlass may be swung into or out of operative position with convenience. Cables 43 and 44 are attached to the pulleys 41 and 42, and the inner of said cables are connected in any suitable manner to the trunnions 24, while the outer cables 44 are attached to grooved pulleys 45, journaled for rotation upon the stub shafts 46 which project from the outer faces of the standards 38 intermediate the ends thereof. These pulleys 45 can be rotated through the medium of the cranks 47 to impart a rotary movement to the shaft 40, thereby raising or lowering the cage relative to the receptacle 18. The pulleys 45 are further equipped with cam locking members 48, by means of which the cage can be held in any desired position in its adjustment. The operation of the device is as follows: The cage is removed from the receptacle and the latter filled with water, after which a fire is started in the fire box 11 and the said water heated to the proper temperature. A hog or other suitable object is next placed within the cage 21, which is swung upward by means of the windlass until the trunnions thereof register with the open ends of the curved portions 20 of the grooves 19. The trunnions are then inserted in these grooves and the cage lowered by means of the windlass, the same being guided into the receptacle through the medium of the grooves 19 and 20. The cage is then grasped by one of the rods 27, and rotated, thus bringing the hog into alternate contact with the hot water and cool air, which loosens the bristles. The cage is then raised from the receptacle and the cover 49 replaced, which can then, if desired, be used as a table to support the hog while it is being scraped.

When it is desired to use the apparatus for the purpose of cooking foods of various natures, the windlass is removed and the food to be cooked placed in the receptacle 18. In order to make the apparatus cheap and more practical, it is the intention of the inventor to install only the base of the apparatus with each person desiring to use the same and to install one windlass among a certain number of persons owning said bases. This will greatly cheapen the cost of the same and make the device more practical.

Fuel can be supplied to the fire-box through a door 50 located in the end thereof opposite the flue. This door 50 is equipped with a regulating draft 51. This end wall 13 is further provided with a drain cock 52, by means of which water can be removed from the receptacle by gravitation. The construction of the fire box adapts the same for using fuel such as straw or the like, which can be fed into the same through the door 54, which is hinged at its upper end and adapted to swing inwardly.

It should be understood in this connection that various minor changes in the specific details of construction can be resorted to within the scope of the appended claim without departing from or sacrificing any of the advantages of the invention.

Having thus fully described this invention, what I claim as new and desire to protect by Letters Patent is:

A hog scalding apparatus consisting of a scalding receptacle having vertically disposed opposite guiding grooves, one wall of each of which is curved upwardly and rearwardly, a rotary scalding cage having axially extended trunnions adapted to operate in said guide grooves, means for rotating said scalding cage in said scalding receptacle, and means mounted upon said receptacle for raising and lowering said rotary scalding cage and for removing and replacing the same from and into said receptacle through the engagement of the trunnions of said cage with said curved wall of the groove in said receptacle.

In testimony whereof I hereunto affix my signature in the presence of two witnesses.

ELMER J. BURRIS.

Witnesses:
S. D. JOHNSON,
DON M. CAMERON.

---

Copies of this patent may be obtained for five cents each, by addressing the "Commissioner of Patents, Washington, D. C."